United States Patent
Barker, Jr. et al.

(10) Patent No.: US 6,767,036 B2
(45) Date of Patent: Jul. 27, 2004

(54) GAS TIGHT HOUSING JOINT USING AN INTERFERENCE FIT WITH ADHESIVE

(75) Inventors: James W. Barker, Jr., Niles, IL (US); Michael R. Maroney, Chicago, IL (US)

(73) Assignees: S&C Electric Co., Chicago, IL (US); MacLean Power, L.L.C., Franklin Park, IL (US)

(*) Notice: Subject to any disclaimer, the term of this patent is extended or adjusted under 35 U.S.C. 154(b) by 0 days.

(21) Appl. No.: 10/017,177

(22) Filed: Dec. 18, 2001

(65) Prior Publication Data

US 2002/0079703 A1 Jun. 27, 2002

Related U.S. Application Data

(60) Provisional application No. 60/257,959, filed on Dec. 26, 2000.

(51) Int. Cl.⁷ .................................................. F16L 35/00
(52) U.S. Cl. ........................ 285/382; 285/915; 285/405
(58) Field of Search .......................... 285/381.1, 915, 285/405, 285.1, 290.5, 382

(56) References Cited

U.S. PATENT DOCUMENTS

| | | | | | |
|---|---|---|---|---|---|
| 3,784,235 | A | * | 1/1974 | Kessler et al. | 285/94 |
| 3,826,025 | A | * | 7/1974 | Elliott | 37/455 |
| 3,859,704 | A | * | 1/1975 | Nasson | 29/894.322 |
| 5,116,172 | A | * | 5/1992 | Koster | 408/226 |
| 5,516,117 | A | * | 5/1996 | Rangel | 473/578 |
| 5,803,553 | A | * | 9/1998 | Wei | 301/63.107 |
| 5,921,591 | A | * | 7/1999 | Argent | 285/330 |
| 6,050,612 | A | * | 4/2000 | Wolterman | 285/259 |

* cited by examiner

Primary Examiner—Eric K. Nicholson
(74) Attorney, Agent, or Firm—James V. Lapacek

(57) ABSTRACT

A method and arrangement is provided to form a gas-tight joint between two housing portions, e.g. between an end flange and a tubular pole-unit housing for a circuit interrupter or an insulating support column. The joint is formed via a heat-shrink process to provide an interference fit. The housing is provided with grooves to retrain adhesive during the assembly process.

3 Claims, 2 Drawing Sheets

GAS TIGHT HOUSING JOINT USING AN INTERFERENCE FIT WITH ADHESIVE

This application claims the benefit of U.S. Provisional Application No. 60/257,959 filed on Dec. 26, 2000 in the names of J. W. Barker JR. and Michael R. Maroney.

BACKGROUND OF THE INVENTION

1. Field of the Invention

The present invention relates generally to the field of gas-tight housings for protective devices and systems for electrical power transmission and distribution systems, and more particularly to a method and arrangement for providing a gas-tight joint between two housing portions, e.g. between an end flange and a tubular pole-unit housing for a circuit interrupter or an insulating support column.

2. Description of the Related Art

Various methods are know for providing a gas-tight joint between a flange/end fitting and a tubular housing, e.g. especially for arrangements involving the end closures of gas-tight enclosures. One method utilizes a heat-shrink process whereby a metallic end flange is heated and assembled onto a tubular housing to which adhesive has been applied. Another method utilizes a flange having internal grooves that is assembled onto a tubular housing.

While the prior art arrangements may be useful to provide housing joints, these prior arrangements do not provide a desirable interference fit and the advantage of a grooved assembly.

SUMMARY OF THE INVENTION

Accordingly, it is a principal object of the present invention to provide a gas-tight joint between a housing and an end flange.

These and other objects of the present invention are efficiently achieved by the provision of a method and arrangement for providing a gas-tight joint between two housing portions, e.g. between an end flange and a tubular pole-unit housing for a circuit interrupter or an insulating support column. The joint is formed via a heat-shrink process to provide an interference fit. The housing is provided with grooves to retain adhesive during the assembly process.

BRIEF DESCRIPTION OF THE DRAWING

The invention, both as to its organization and method of operation, together with further objects and advantages thereof, will best be understood by reference to the specification taken in conjunction with the accompanying drawing in which:

FIG. 1 is a perspective view of a circuit interrupter with parts cut away for clarity that utilizes the joint method and arrangement of the present invention;

DETAILED DESCRIPTION

Figure 2:
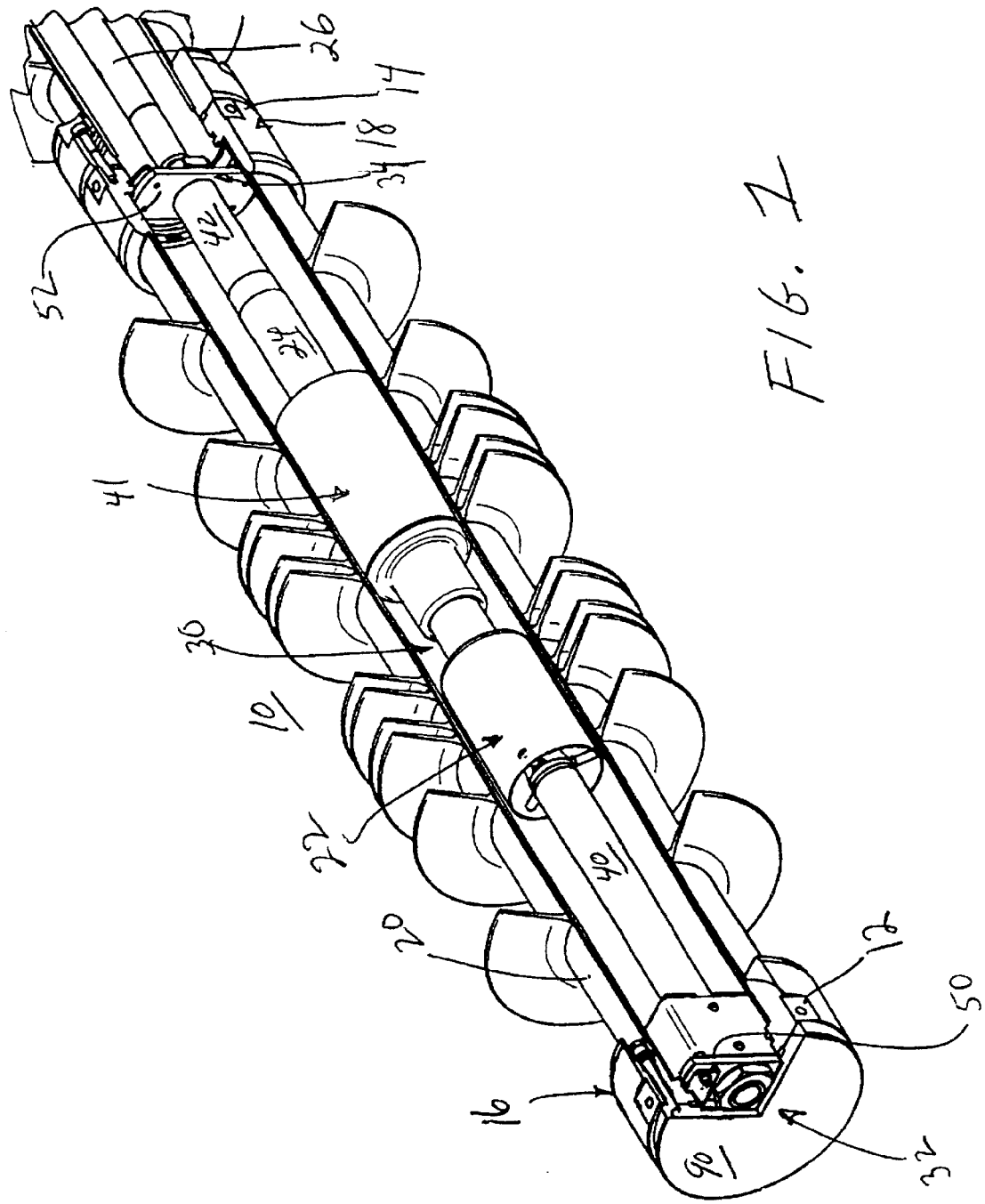
FIG. 2 is a partial sectional view of the circuit interrupter of FIG. 1.
Figure 2:
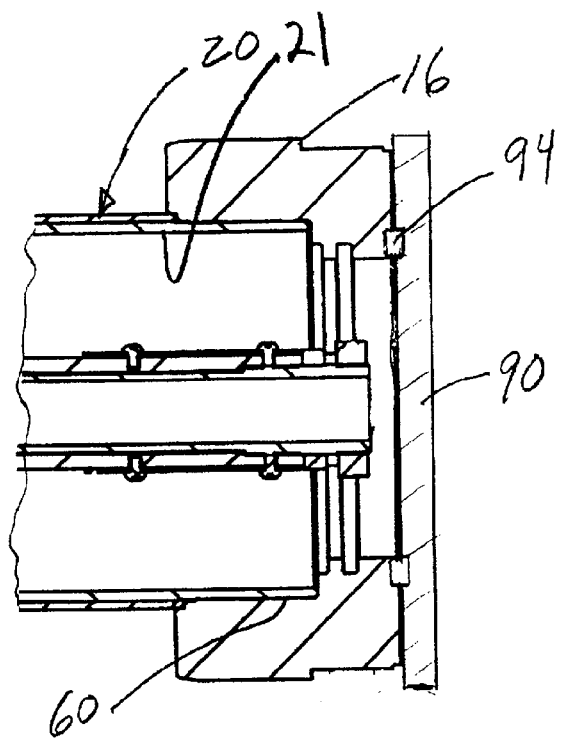

Referring now to an illustrative application of the present invention as shown in FIGS. 1 and 2, a circuit interrupter 10 utilizing the method and arrangement of the present invention provides electrical connection to power system circuit terminals at connection points 12, 14, at the top and bottom respectively of the circuit interrupter 10. In an illustrative embodiment, a housing 20 of the operating mechanism 10 provides a sealed environment containing a gas, e.g. an insulating gas such as $SF_6$. This is advantageous in implementations where the interrupter 10 contains a pressurized gas such as $SF_6$. The connection points 12, 14 are provided on respective end flanges 16, 18 carried by the housing 20 of the circuit interrupter 10. The end flanges 16, 18 are affixed to the housing 20 during fabrication thereof to provide gas-tight joints as will be explained in more detail hereinafter.

The circuit interrupter 10 includes upper and lower current carrying contact structures 22, 24 respectively that are relatively movable to open and close the circuit interrupter and thus make and break the electrical connection between the connection points 12, 14. In the illustrative circuit interrupter 10 of FIG. 1, the lower contact structure 24 is movable via an operating rod 26 so as to define an open gap at 30 when the circuit interrupter 10 is open. Specifically, the lower contact structure 24 includes a movable contact member 41 that is movable via the operating rod 26 and a fixed contact member 42 that supports and transfers current at 43 to the movable contact member 41 that moves within the fixed contact member 42. For example, a flexible contact arrangement is provided at 43 between the relatively movable contact members 41, 42. At the upper end of the circuit interrupter 10, an end plate 90 is secured to the upper end flange 16 along with an appropriate sealing element 94 (FIG. 2).

Figure 3:
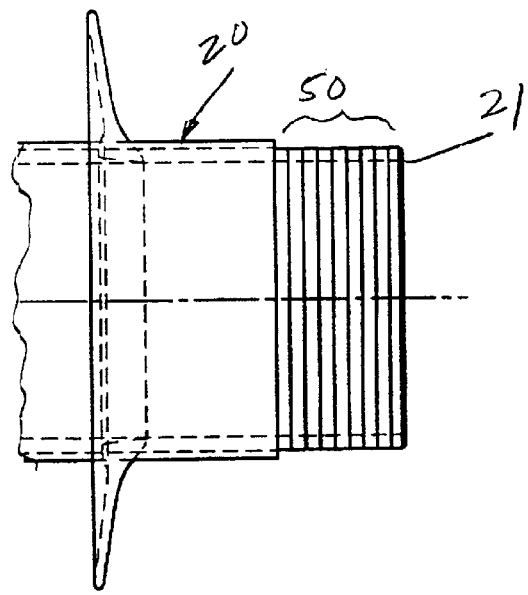
FIG. 3 is an elevational view of a portion of the housing of the circuit interrupter of FIGS. 1 and 2.
Figure 4:
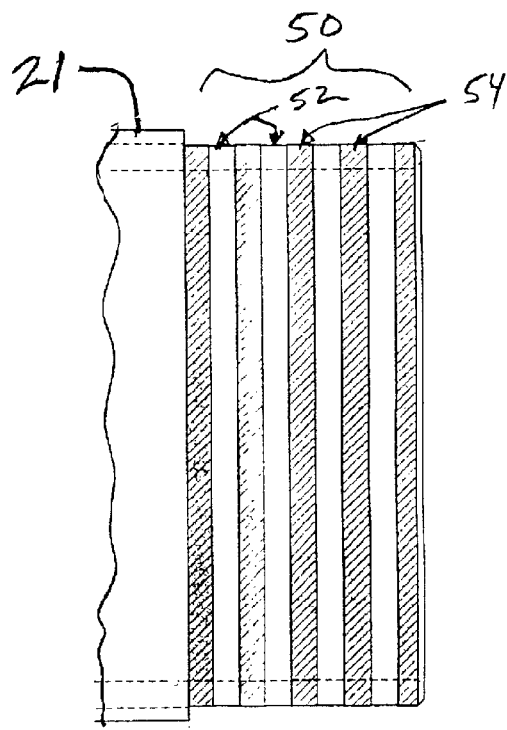
FIG. 4 is an enlarged partial view of the housing of FIG. 3.

Considering now important aspects of the present invention, a gas-tight joint is provided between the housing 20 and the end flanges 16 and 18. In a preferred embodiment, the assembly is accomplished via a heat-shrink process whereby the end flanges 16, 18 are heated and assembled onto the tubular housing 20 to which adhesive has been applied. Referring now additionally to FIGS. 3–4, the tubular housing 20 at each end portion includes a pattern 50 of grooves 52, e.g. five grooves 52 in an illustrative specific embodiment. The grooves 52 are formed or machined so as to define reduced outer diameter bands or regions on the external circumference of the housing 20, e.g. grooves 50 alternating between the larger outer diameter portions 54 of the housing 20, the portions 54 also may be characterized as bands or regions 54. During assembly, adhesive is applied over the pattern 50. The inner diameter 60 (FIG. 2) of the end flanges 16, 18 is dimensioned at normal temperatures to be a predetermined dimension less than the outer diameter of the tubular housing 20 at the regions or bands 54, e.g. 0.010 of an inch for a tubular housing 22 of approximately 5 inches outer diameter. Thus, an interference fit is established between the portions 54 and the end flanges 16, 18, the end flanges 16, 18 being heated to afford clearance between the housing and the flange for assembly, e.g. heating to a temperature in the range of 150–200 degrees Centigrade, e.g. for end flanges 16, 18 fabricated from aluminum and a housing 22 fabricated from fiberglass. This results in an appropriate interference fit when the parts are cooled, e.g. a gas-tight joint over a temperature range of –40 C. to +85 C. with a gas pressure of 75 psi. In a specific implementation, the grooves 52 are approximately 0.005 of an inch deep and the bands or regions defined thereby are approximately 0.250 of an inch wide. These dimensions have been found to provide a suitable gas-tight joint using epoxy adhesive in the grooves 52, i.e. the grooves 52 retain sufficient adhesive during and after assembly.

The relative dimensions including the depth of the grooves 52 are chosen to ensure that a desirable and appropriate amount of adhesive is retained therein during the heat-shrink assembly process and even if some wiping action occurs at the high points at 54. These dimensions have also been found suitable to avoid excessive adhesive that might result from grooves 52 of excessive depth that might result in any significant degradation of the joint between the end flanges 16, 18 and the tubular housing 20 during thermal extremes. Thus, the grooves 52 maintain the appropriate amount of adhesive to ensure a gas-tight joint and the intermediate portions 54 provide a desirable mechanical shrink fit over a desired range of temperatures, i.e. in a specific example, the gas-tight interference joint is maintained at 85 C. and no damage is done to the housing 20 as a result of the added compressive forces at −40 C. Additionally, the gas-tight joint is maintained when the housing 20 is loaded with a resultant moment at the joint of 20–30,000 in-lb.

While there have been illustrated and described various embodiments of the present invention, it will be apparent that various changes and modifications will occur to those skilled in the art. Accordingly, it is intended in the appended claims to cover all such changes and modifications that fall within the true spirit and scope of the present invention.

What is claimed is:

1. A gas-tight housing comprising a tubular housing and an end flange that are dimensioned and assembled to provide an interference fit therebetween after assembly via a heat-shrink assembly process, said housing comprising joint-forming means for providing a gas-tight joint, said joint-forming means comprising a plurality of grooves formed in said tubular housing and adhesive being applied in said grooves with said plurality of grooves being dimensioned such that sufficient adhesive is retained in said grooves during and after assembly to ensure a gas-tight joint, the depth of the plurality of grooves being less than the amount of the interference fit between the tubular housing and the end flange.

2. A gas-tight housing comprising a tubular housing and an end flange that are dimensioned and assembled to provide an interference fit therebetween after assembly via a heat-shrink assembly process, said housing comprising joint-forming means for providing a gas-tight joint, said joint-forming means comprising a plurality of grooves formed in said tubular housing and adhesive being applied in said grooves with said plurality of grooves being dimensioned such that sufficient adhesive is retained in said grooves during and after assembly to ensure a gas-tight joint, the plurality of grooves each being approximately 0.250 inch wide.

3. The housing of claim 2 wherein the amount of interference fit is approximately 0.010 inch and the depth of the plurality of grooves is approximately 0.005 inch.

* * * * *